(12) United States Patent
Bjorstrom et al.

(10) Patent No.: US 7,430,096 B1
(45) Date of Patent: Sep. 30, 2008

(54) HEAD SUSPENSION WITH ETCHED RAIL LOAD BEAM

(75) Inventors: Jacob D. Bjorstrom, Waconia, MN (US); Reid C. Danielson, Cokato, MN (US); Mark A. Miller, Darwin, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 706 days.

(21) Appl. No.: 10/350,914

(22) Filed: Jan. 24, 2003

(51) Int. Cl.
*G11B 5/48* (2006.01)
(52) U.S. Cl. .................................. 360/244.9
(58) Field of Classification Search ............. None
See application file for complete search history.

(56) References Cited

U.S. PATENT DOCUMENTS

| | | | |
|---|---|---|---|
| 3,931,641 A | 1/1976 | Watrous | |
| 4,734,805 A | 3/1988 | Yamada et al. | |
| 4,853,811 A | 8/1989 | Brooks, Jr. et al. | |
| 4,933,791 A | 6/1990 | Cheng | |
| 5,003,420 A | 3/1991 | Hinlein | |
| 5,027,240 A | 6/1991 | Zarouri et al. | |
| 5,027,241 A | 6/1991 | Hatch et al. | |
| 5,079,660 A | 1/1992 | Yumura et al. | |
| 5,081,553 A | 1/1992 | Wanlass et al. | |
| 5,126,904 A | 6/1992 | Sakurai | |
| 5,339,208 A | 8/1994 | Yumura et al. | |
| 5,434,731 A * | 7/1995 | Hagen | 360/245.5 |
| 5,471,734 A | 12/1995 | Hatch et al. | |
| 5,812,342 A | 9/1998 | Khan et al. | |
| 5,815,348 A | 9/1998 | Danielson et al. | |
| 5,923,500 A * | 7/1999 | Hagen | 360/245.3 |
| 5,943,774 A | 8/1999 | Danielson et al. | |
| 6,154,344 A * | 11/2000 | Marek | 360/264.2 |
| 6,219,202 B1 * | 4/2001 | Palmer | 360/234.5 |
| 6,219,203 B1 | 4/2001 | Arya et al. | |
| 6,268,981 B1 * | 7/2001 | Coon et al. | 360/244.3 |
| 6,288,877 B1 * | 9/2001 | Khan et al. | 360/245.9 |
| 2002/0051319 A1 | 5/2002 | Takagi et al. | |

FOREIGN PATENT DOCUMENTS

JP H11-356444 12/1999

* cited by examiner

*Primary Examiner*—Joseph Feild
*Assistant Examiner*—Mark Blouin
(74) *Attorney, Agent, or Firm*—Faegre & Benson LLP

(57) ABSTRACT

A head suspension load beam having a longitudinal axis, first and second edges, and first and second opposite side surfaces. The load beam includes a central rail structure extending along at least a part of the longitudinal axis. The load beam also includes a first elongated partially etched portion in the first side surface of the load beam extending along a substantially entire length of the first edge of the load beam, as well as a second elongated partially etched portion in the first side surface of the load beam extending along a substantially entire length of the second edge of the load beam.

28 Claims, 17 Drawing Sheets

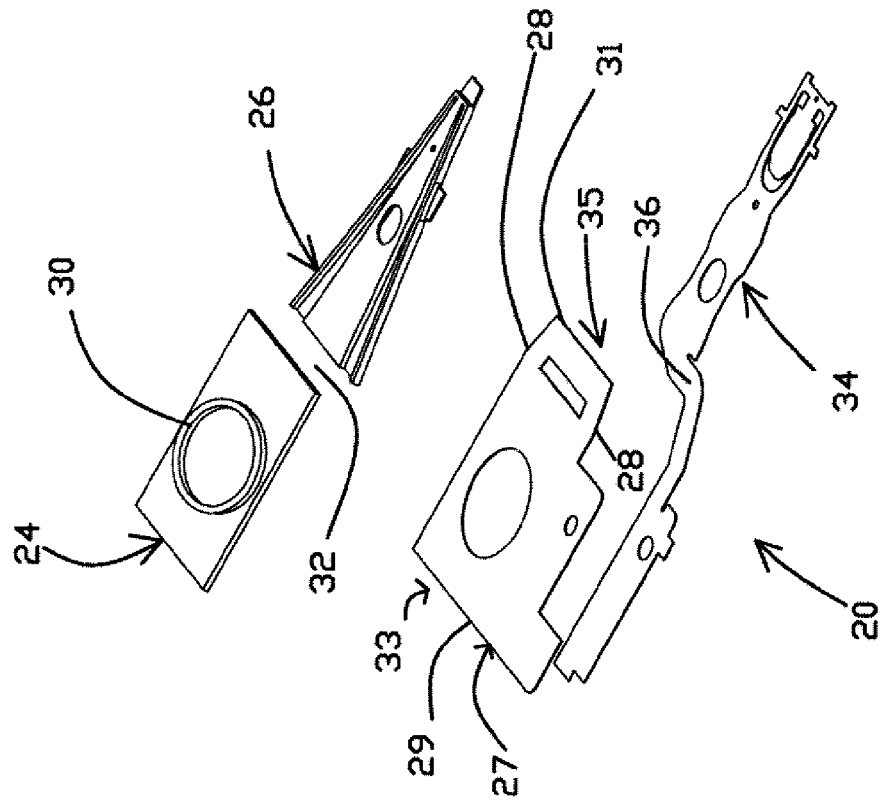
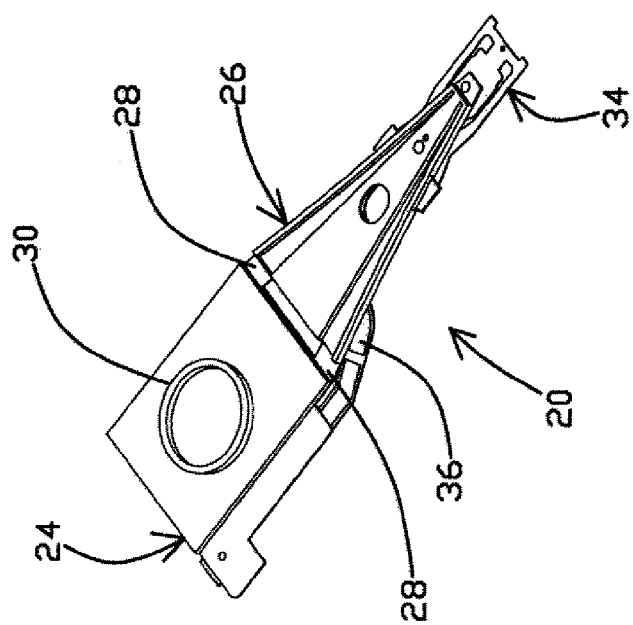
FIG. 1b
FIG. 1a

HEAD SUSPENSION WITH ETCHED RAIL LOAD BEAM

FIELD OF THE INVENTION

The present invention relates to an improved load beam for a head suspension assembly to be used in dynamic storage devices or rigid disk drives. More specifically, this invention is directed to certain improvements in the construction of a load beam of a suspension assembly by the inclusion of partially etched channels.

BACKGROUND OF THE INVENTION

Information storage devices typically include an air bearing slider assembly for reading and/or writing data onto the storage medium, such as a disk within a rigid disk drive. An actuator mechanism is used for positioning the slider assembly at specific locations or tracks in accordance with the disk drive usage. Linear and rotary actuators are known based on the manner of movement of the slider assembly. Head suspensions are provided between the actuator and the slider assembly and support the slider assembly in proper orientation relative to the disk surface. Head suspensions of this type are commonly manufactured by chemically etching flat or unformed load beam blanks from thin sheets of stainless steel.

In reaction to the moving air at the surface of the spinning disk, the slider assembly develops an aerodynamic force which causes the slider assembly to lift away from and "fly" over the disk surface. In order to establish the fly height, the head suspension is also provided with a spring force counteracting the aerodynamic lift force. The height at which the slider assembly flies over the disk surface is known as the "fly height." The force exerted by the suspension on the slider assembly when the slider assembly is at fly height is known as the "gram load."

An important performance-related criteria of a suspension is specified in terms of its resonance characteristics. In order for the slider assembly to be accurately positioned with respect to a desired track on the magnetic disk, the suspension must be capable of precisely translating or transferring the motion of the positioning arm to the slider assembly. An inherent property of moving mechanical systems, however, is their tendency to bend and twist in a number of different modes when driven back and forth at certain rates known as resonant frequencies. Any such bending or twisting of a suspension can cause the position of the slider assembly to deviate from its intended position with respect to the desired track. Since the head suspension assemblies must be driven at high rates of speed in high performance disk drives, it is desirable for the resonant frequencies of a suspension to be as high as possible. The detrimental effects of the bending and twisting at the resonance frequencies can also be reduced by minimizing the extent of the bending and twisting motion of the suspension (also known as the gain) at the resonant frequencies.

Common bending and twisting modes of suspensions are generally known and discussed, for example, in the Yumura et al. U.S. Pat. No. 5,339,208 and the Hatch et al. U.S. Pat. No. 5,471,734. Modes that result in lateral or transverse motion (also known as off-track motion) of the slider assembly are particularly detrimental since this motion causes the slider assembly to move from the desired track on the disk toward an adjacent track. The three primary modes that produce the transverse motion are known as the sway, first torsion and second torsion modes. The sway mode is a lateral bending mode (i.e., the suspension bends in the transverse direction along its entire length). The first and second torsion modes are twisting modes during which the suspension twists about a rotational axis that extends along the length of the suspension. The first and second torsion modes produce transverse motion of the slider assembly if the center of rotation of the suspension is not aligned with the gimbal point of the slider assembly.

Head suspensions typically include elongated and often generally triangularly-shaped load beams. Torsion and sway modes are dependent on cross-sectional properties along the length of the load beam of the head suspension. These modes are normally controlled by the design of the cross-section of the load beam, i.e., side rails, channels, and the like. It is important to design the geometries of load beams so that they either possess resonance frequencies sufficiently high to be out of the range of vibration frequencies that may be experienced in particular disk drives, or to minimize the gain caused by any such resonance frequency.

Typically, side rails are provided at the longitudinal edges of the load beam, such as by bending the edges out of the plane of the load beam. Load beams having side rails are described, for example, in U.S. Pat. Nos. 3,931,641, 4,734, 805, 4,853,811, 4,933,791, 5,003,420, 5,027,240, 5,027,241, 5,079,660, and 5,081,553. Forming one or more longitudinal channels on a load beam between the longitudinal edges of the load beam are described, for example, in U.S. Pat. Nos. 5,815,348 and 5,943,774.

Constructions of load beams through partial etching process have also been developed. Such load beams are described, for example, in U.S. Patent Application 2002/0051319 and U.S. Pat. Nos. 6,219,203 and 5,812,342. U.S. Patent Application 2002/0051319 shows a load beam having recesses formed by partial etching on one side of the load beam. U.S. Pat. No. 6,219,203 discloses a load beam having a ribbed structure simultaneously etched on both sides of the load beam. U.S. Pat. No. 5,812,342 disclosed a load beam having a longitudinally distributed series of transverse trenches.

There remains, however, a continuing need for suspensions having improved resonance characteristics. In particular, there is a need for designing and manufacturing head suspension load beams having optimized resonance characteristics.

SUMMARY OF THE INVENTION

The present invention is directed to a head suspension load beam having a longitudinal axis, first and second edges, and first and second side surfaces. The load beam includes a central rail structure extending along at least a part of the longitudinal axis. The load beam also includes a first elongated partially etched portion in the first side surface of the load beam extending along a substantially entire length of the first edge of the load beam, as well as a second elongated partially etched portion in the first side surface of the load beam extending along a substantially entire length of the second edge of the load beam.

In a preferred embodiment of the present invention, the head suspension load beam has a central rail structure along the central longitudinal axis of the load beam. The central rail structure includes a partially etched bottom channel in the bottom surface of the load beam. The partially etched bottom channel extends along at least a portion of the central longitudinal axis. The load beam further includes first and second partially etched top portions in the top surface of the load beam. The first partially etched top portion is adjacent to the first edge of the load beam. The second partially etched top portion is adjacent to the second edge of the load beam. The first and second partially etched top portions are generally symmetric with respect to the central longitudinal axis.

The central rail structure of the load beam includes a first inner rail and a second inner rail. The first inner rail is located between the partially etched bottom channel and the first partially etched top portion. The second inner rail is located between the partially etched bottom channel and the second partially etched top portion. The first and second inner rails are symmetric with respect to the central longitudinal axis of the load beam. The cross-section of the load beam according to the invention has a corrugated shape.

The load beam further includes a first outer rail extending generally along the first edge of the load beam and a second outer rail extending generally along the second edge of the load beam. The first and second outer rails are generally symmetric with respect to a central longitudinal axis of the load beam.

BRIEF DESCRIPTION OF THE DRAWINGS

FIG. 1a is an assembly view of a head suspension with an etched rail load beam in accordance with the present invention.

FIG. 1b is an exploded view of the head suspension of FIG. 1a.

FIG. 2b is a bottom view of the etched rail load beam of FIG. 2a.

FIG. 7b is a bottom view of the etched rail load beam of FIG. 7a.

FIG. 9b is a bottom view of the etched rail load beam of FIG. 9a.

FIG. 11b is an isometric view of the bottom surface of the etched rail load beam of FIG. 11a.

FIG. 12b is a bottom view of the etched rail load beam of FIG. 12a.

DETAILED DESCRIPTION OF THE INVENTION

Figure 2A:
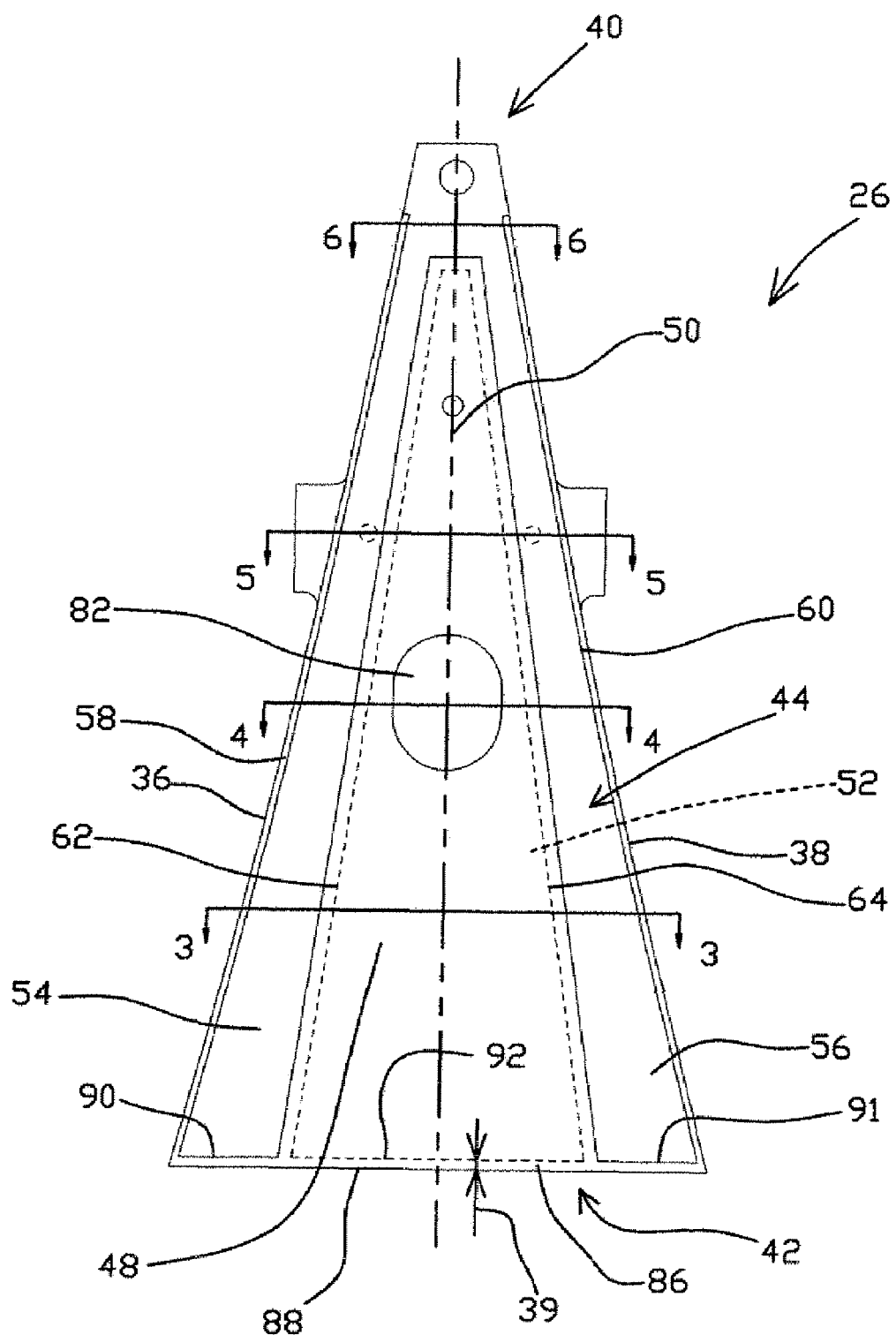
FIG. 2a is a top view of the etched rail load beam shown in FIGS. 1a and 1b.

FIGS. 1a and 1b illustrate an assembly view and an exploded view, respectively, of a multi-piece head suspension assembly 20 in accordance with the present invention. The multi-piece head suspension assembly 20 includes a base plate 24, a load beam 26, and a mounting member 27. The base plate 24 includes an integral boss tower 30. The mounting member 27 is a separate component, which has a proximal region 29 on its proximal end 33 and a distal region 31 on its distal end 35. The mounting member 27 also has a spring region 28 between the proximal region 29 and the distal region 31. The base plate 24 is attached to the proximal region 29 of the mounting member 27. The load beam 26 is attached to the distal region 31 of the mounting member 27. The mounting member 27 extends across a gap 32 between the base plate 24 and the load beam 26. A flexure 34 includes a lead support 36 for supporting electrical leads to a slider assembly (not shown). The base plate 24, the load beam 26, the mounting member 27, and the flexure 34 are aligned and joined together by spot welding, adhesives, or a variety of other techniques.

Figure 2B:
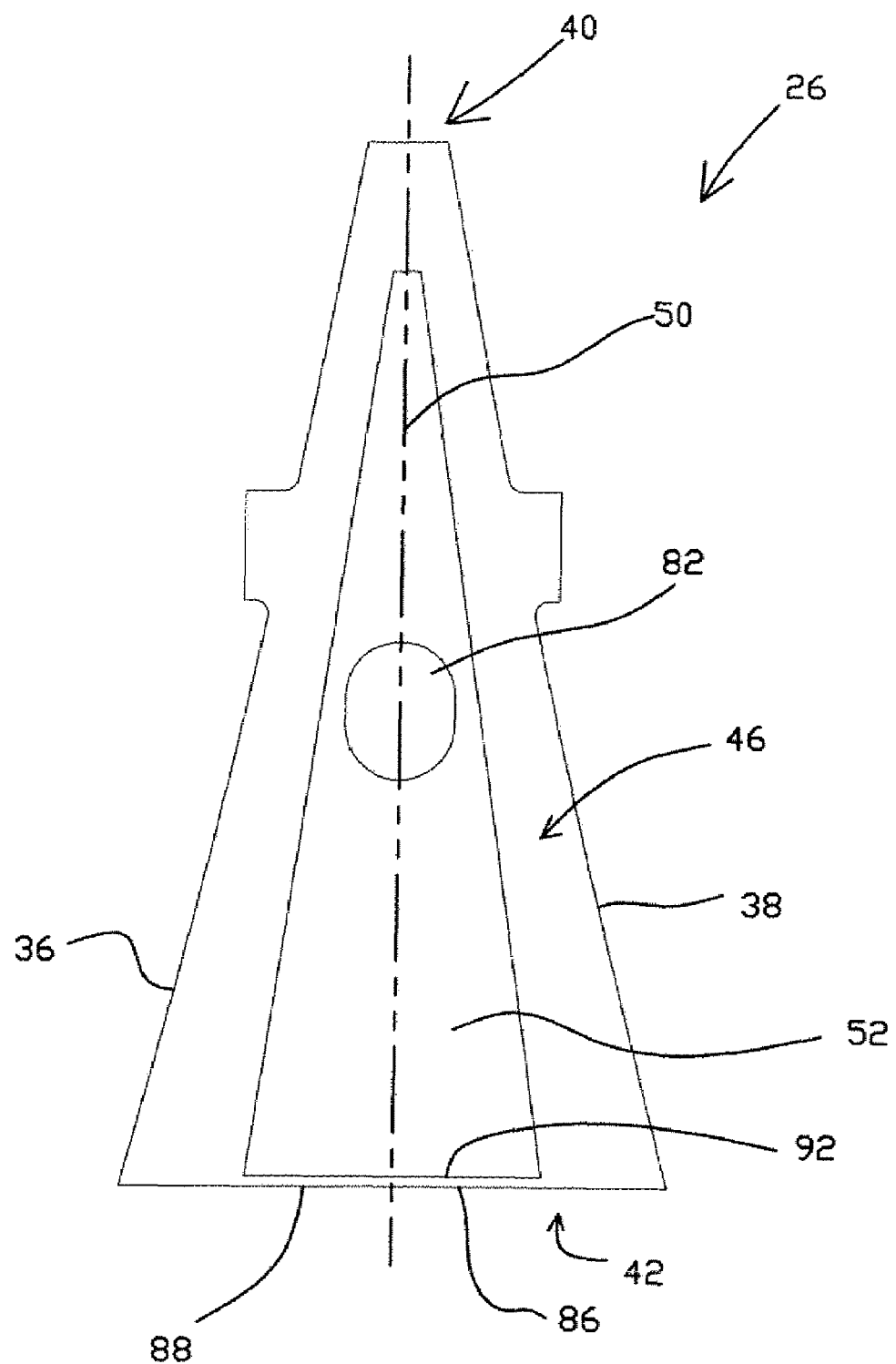
Figure 3:
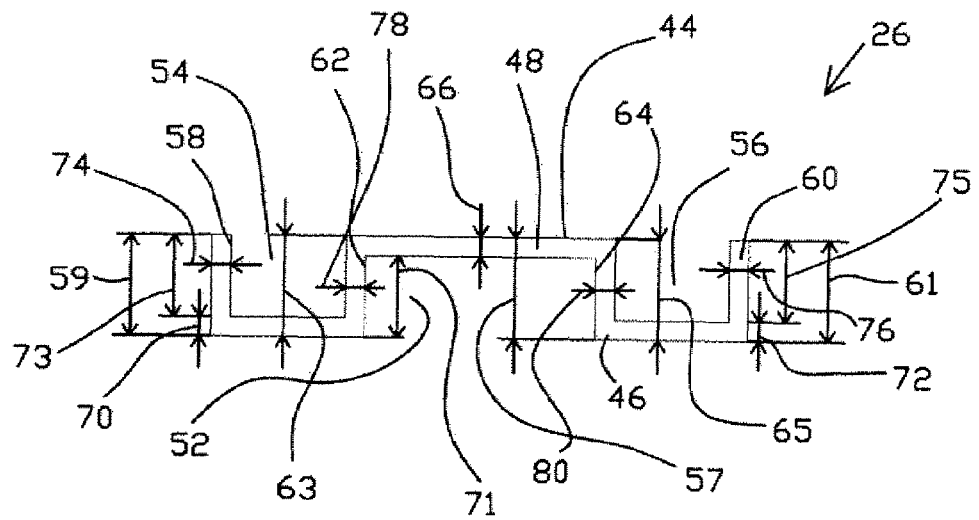
FIG. 3 is a cross-sectional view of the etched rail load beam of FIG. 2a, taken along Line 3-3.
Figure 4:
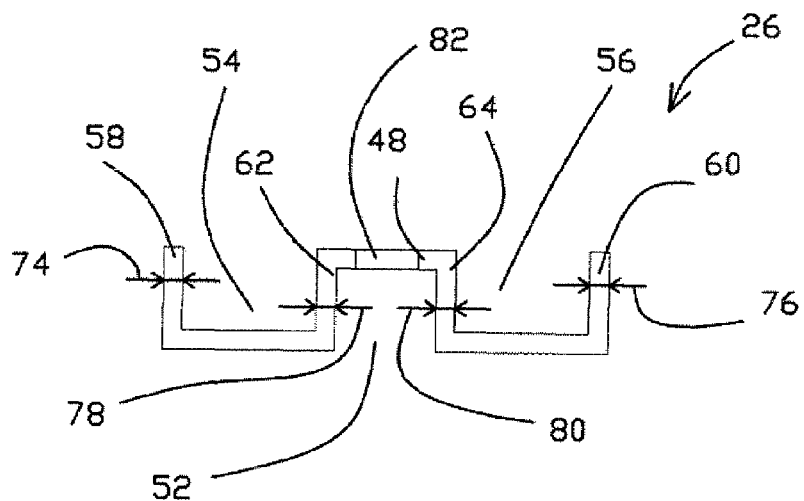
FIG. 4 is a cross-sectional view of the etched rail load beam of FIG. 2a, taken along Line 4-4.
Figure 5:
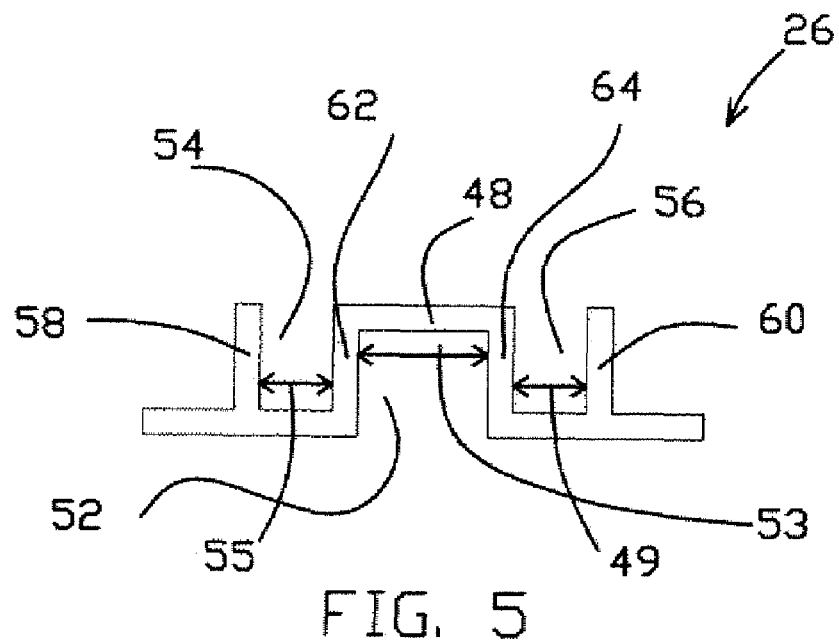
FIG. 5 is a cross-sectional view of the etched rail load beam of FIG. 2a, taken along Line 5-5.
Figure 6:
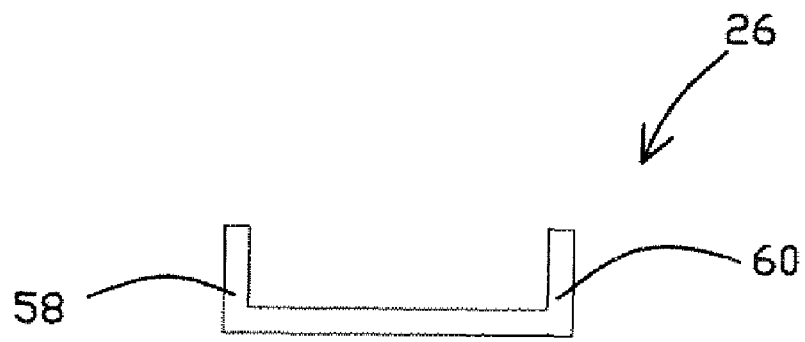
FIG. 6 is a cross-sectional view of the etched rail load beam of FIG. 2a, taken along Line 6-6.

FIG. 2a is a top view of the load beam 26 shown in FIGS. 1a and 1b. FIG. 2b is a bottom view of the load beam 26 of FIG. 2a. The load beam 26 includes a first edge 36, a second edge 38, a distal end 40, a proximal end 42, a top surface 44, and a bottom surface 46. The load beam 26 has a central rail structure 48 that extends generally along a central longitudinal axis 50 of the load beam 26. A bottom channel 52 is partially etched into the bottom surface 46 of the load beam 26. The partially etched bottom channel 52 is located in the central rail structure 48 and extends along the central longitudinal axis 50. The lengths of the central rail structure 48 and the partially etched bottom channel 52 extend substantially an entire distance between the distal and proximal ends 40 and 42 of the load beam 26 in the illustrated embodiment. Alternatively, the lengths of the central rail structure 48 and the partially etched bottom channel 52 may extend a partial distance between the distal and proximal ends 40 and 42. Alternatively, the lengths of the central rail structure 48 and the partially etched bottom channel 52 do not extend substantially an entire distance between the distal and proximal ends 40 and 42, but extend greater than about one-half a length of the load beam 26.

First and second top channels 54 and 56 are partially etched into the top surface 44 of the load beam 26, respectively. The first partially etched top channel 54 is located along and adjacent to the first edge 36 to define a first outer rail 58. Similarly, the second partially etched top channel 56 is located along and adjacent to the second edge 38 to define a second outer rail 60. In the illustrated embodiment, the lengths of the first and second partially etched top channels 54 and 56 extend substantially an entire distance between the distal and proximal ends 40 and 42 of the load beam 26, respectively. Alternatively, the lengths of the first and second partially etched top channels 54 and 56 may extend a partial distance between the distal and proximal ends 40 and 42, respectively. Alternatively, the lengths of the first and second partially etched top channels 54 and 56 do not extend substantially an entire distance between the distal and proximal ends 40 and 42, but extend greater than about one-half a length of the load beam 26.

FIGS. 3-6 are cross-sectional views of the etched rail load beam 26 of FIG. 2a, taken along Lines 3-3, 4-4, 5-5, and 6-6, respectively. As shown in these figures, the cross section of the load beam 26 has a corrugated shape. The height 59 of the first outer rail 58 and the height 61 of the second outer rail 60 are equal. They are equal to the original thickness 57 of the load beam 26. As used herein, the "original thickness" refers to a thickness between the top and bottom surfaces 44, 46. Generally, the original thickness of the load beam is between about 5 mils and about 12 mils. The original thickness 57 as shown in FIGS. 2a and 2b is about 8 mils.

The first partially etched top channel 54 in the top surface 44 and the partially etched bottom channel 52 in the bottom surface 46 define a first inner rail 62. Likewise, the second partially etched top channel 56 in the top surface 44 and the partially etched bottom channel 52 in the bottom surface 46 define a second inner rail 64. The height 63 of the first inner rail 62 and the height 65 of the second inner rail 64 are equal. They are both equal to the original thickness 57 of the load beam 26. The thickness 70 of the remaining material of the first partially etched top channel 54 is generally equal to the thickness 72 of the remaining material of the second partially etched top channel 56. The partially etched bottom channel 52 has a depth 71 that overlaps the depths 73 and 75 of first and second partially etched top channels 54 and 56, respectively. The dimensions of the overlap vary with the original thickness of the load beam and the thickness of the remaining material. The thickness 66 of the remaining material of the partially etched bottom channel 52 is preferably equal to the thicknesses 70 and 72 of the remaining material of the first and second partially etched top channels 54 and 56, respectively. Generally, the thickness of the remaining material of the channels is between about 1 mil and about 3 mils. The thickness of the remaining material of the channels in the illustrated embodiment is about 1.5 mils.

Referring back to FIGS. 2a and 2b, the structures of the load beam 26 are generally symmetric with respect to the central longitudinal axis 50. In particular, the partially etched bottom channel 52 is generally symmetric with respect to the central longitudinal axis 50. Moreover, the first and second partially etched top channels 54 and 56 are generally symmetric with respect to the central longitudinal axis 50.

In addition, the first and second outer rails 58 and 60 are generally symmetric with respect to the central longitudinal axis 50. In the illustrated embodiment, both the width 74 of the first outer rail 58 and the width 76 of the second outer rail 60 (shown in FIGS. 3 and 4) are uniform with increasing distance from the proximal end 42 of the load beam 26. In an alternative embodiment, the width 74 and the width 76 are not uniform. Generally, the width 74 and the width 76 are equal and are between about 0.05 mm and about 0.3 mm.

Further, the first and second inner rails 62 and 64 are generally symmetric with respect to the central longitudinal axis 50. In the illustrated embodiment, both the width 78 of the first inner rail 62 and the width 80 of the second inner rail 64 (shown in FIGS. 3 and 4) are uniform with increasing distance from the proximal end 42 of the load beam 26. In an alternative embodiment, the width 74 and the width 76 are not uniform. Generally, the width 78 and the width 80 are equal and are between about 0.1 mm and about 0.3 mm.

The load beam 26 generally has a delta shape in the illustrated embodiment. In other words, the load beam 26 has a tapered width such that the width decreases from its proximal end 42 toward its distal end 40. The partially etched bottom channel 52 in the bottom surface 46 has a shape generally corresponding to the shape of the load beam 26. As a result, the partially etched bottom channel 52 has a delta shape. In other words, the width 53 (shown in FIG. 5) of the partially etched bottom channel 52 decreases with increasing distance from the proximal end 42 of the load beam 26. Generally, the width 53 varies between about 0.5 mm and about 2.5 mm.

The width 55 of the first partially etched top channel 54 (shown in FIG. 5) is not uniform with increasing distance from the proximal end 42 of the load beam 26. Likewise, the width 49 of the second partially etched top channels 56 (shown in FIG. 5) is not uniform with increasing distance from the proximal end 42 of the load beam 26. The first and second partially etched top channels 54, 56 each have a tapered width 55, 49, such that the width decreases from the proximal end 42 toward distal end 40 of the load beam 26. The width 55, 49 of the partially etched top channels 54, 56 is generally between about 0.5 mm and about 1.2 mm. The first and second partially etched top channels 54, 56 join together at the distal end 40 in the illustrated embodiment.

The load beam 26 generally includes at least one aperture 82. The aperture 82 completely extends through the remaining material of the partially etched bottom channel 52. The aperture 82 can be used as a tooling hole during assembly of the load beam 26 or during attachment of the slider.

As shown in FIGS. 2a and 2b, the load beam 26 further includes a proximal rail 86 located at the proximal end 42 of the load beam 26. The proximal rail 86 is defined by edges 90 and 91 of the partially etched top channels 54 and 56, an edge 92 of the partially etched bottom channel 52, and an edge 88 of the proximal end 42. The proximal rail 86 is perpendicular to the central longitudinal axis 50. The height of the proximal rail 86 is equal to the original thickness of the load beam 26. The width 39 of the proximal rail is generally uniform. The proximal rail 86 in the illustrated embodiment is not necessarily required in the construction of the load beam 26.

Figure 7A:
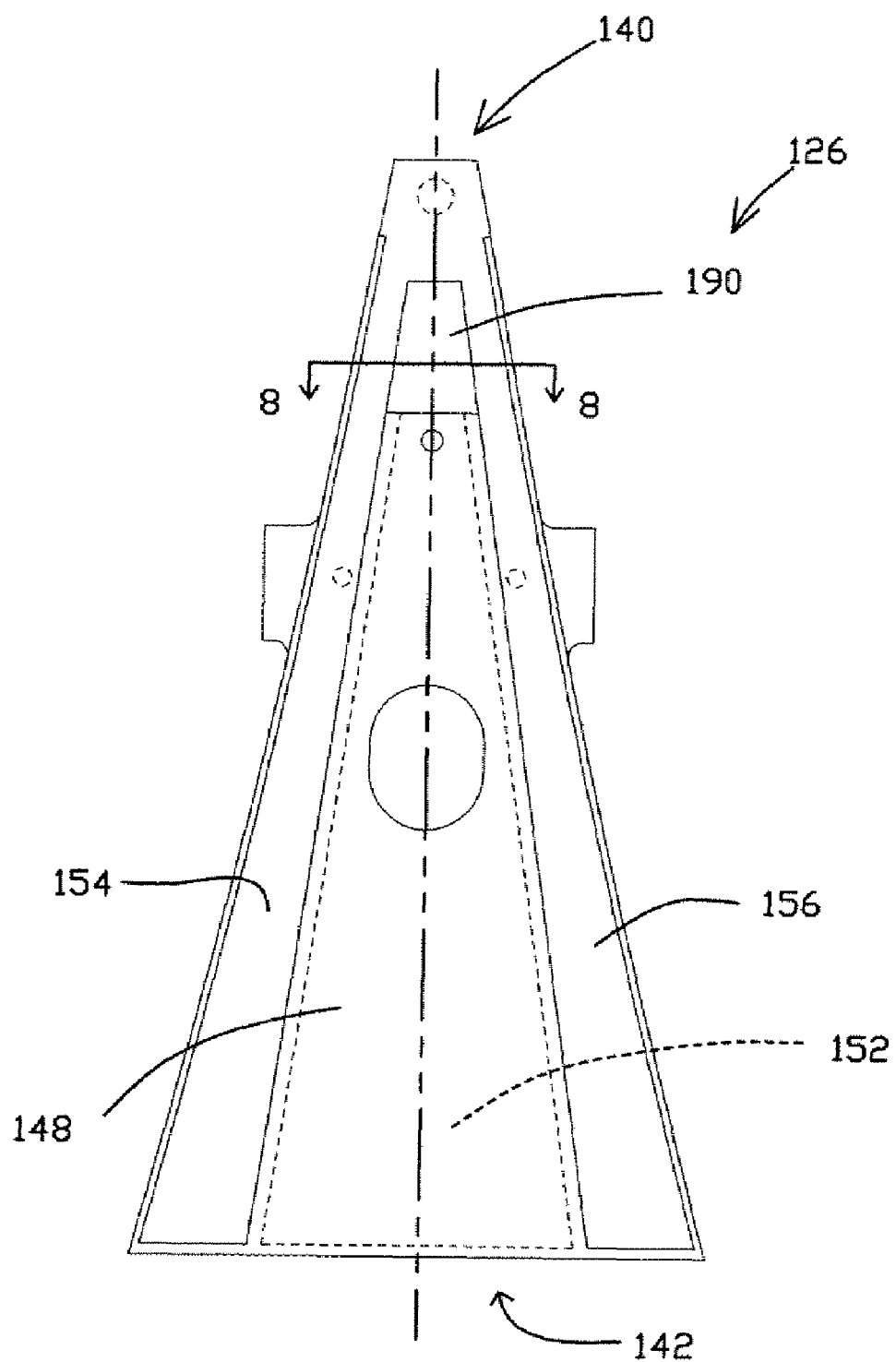
FIG. 7a is a top view of a second embodiment of an etched rail load beam in accordance with the present invention.
Figure 7B:
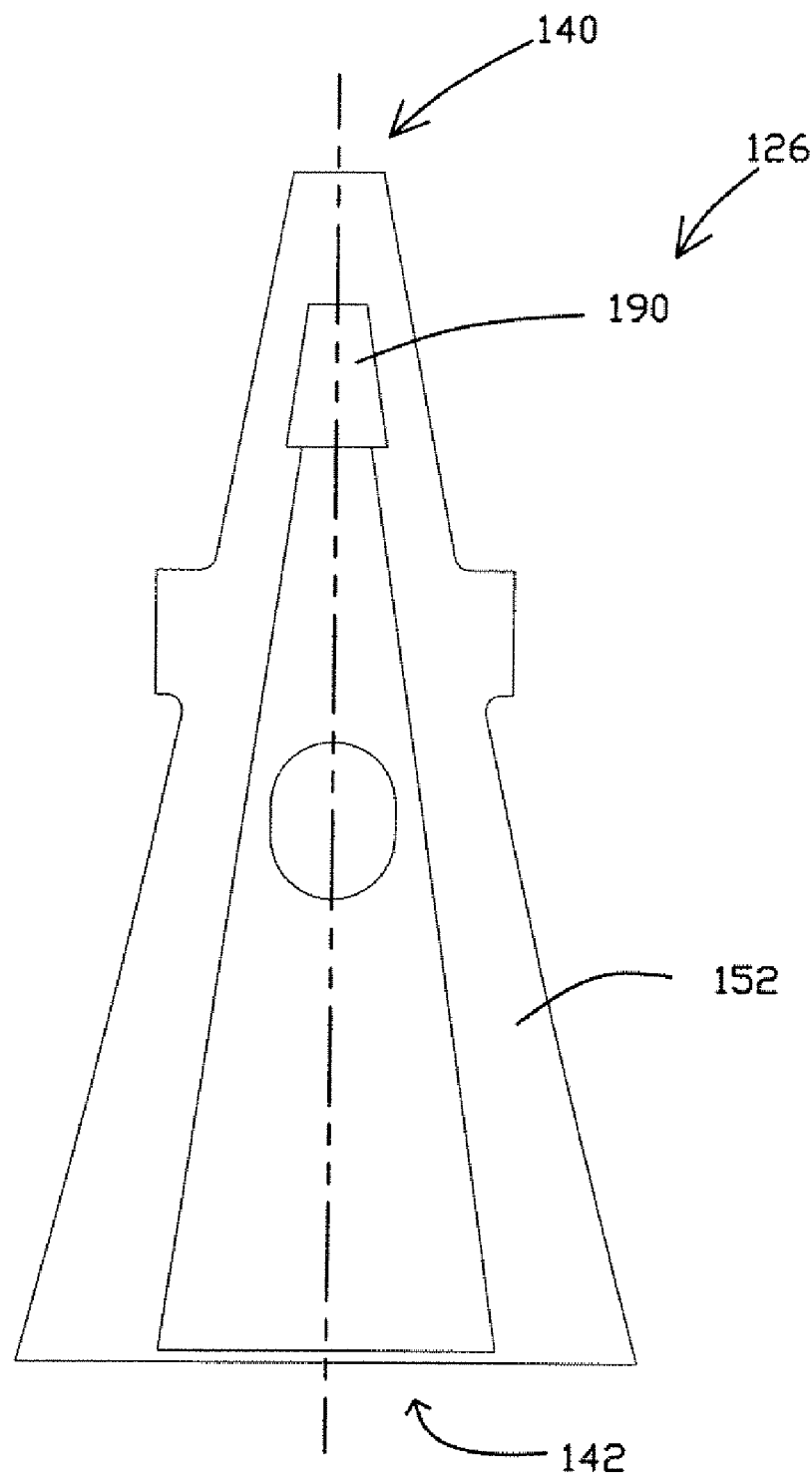
Figure 8:
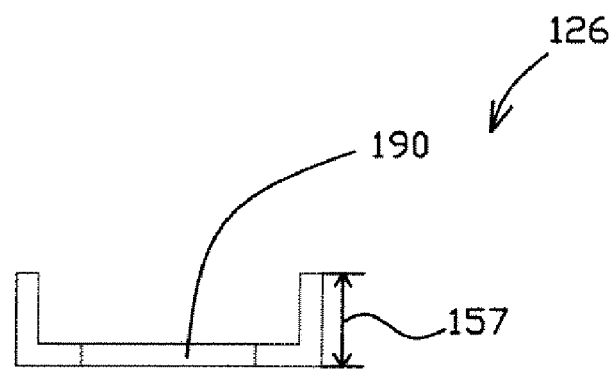
FIG. 8 is a cross-sectional view of the etched rail load beam of FIG. 7a, taken along Line 8-8.

FIGS. 7a and 7b illustrate a second embodiment of an etched rail load beam 126. FIG. 8 is a cross-sectional view of the etched rail load beam 126 of FIG. 7a, taken along Line 8-8. The structure of the load beam 126 is similar to that of the load beam 26 shown in FIGS. 2a and 2b, except that the load beam 126 has an aperture 190 extending through the material of the load beam 126 adjacent to the distal end 140 of the load beam 126. The aperture 190 is used as a mass reduction hole to improve the performance of the load beam 126. Because the aperture 190 extends through the material of the load beam 126, the lengths of the central rail structure 148 and the partially etched bottom channel 152 do not extend an entire distance between the distal and proximal ends 140 and 142. The lengths of the central rail structure 148 and the partially etched bottom channel 152 are preferably greater than about one-half a length of the load beam 126.

Generally, the original thickness 157 of the load beam 26 is between about 5 mils and about 12 mils. The original thickness 157 of the load beam 126 is about 6 mils in the illustrated embodiment (shown in FIG. 8). The thickness of the remaining material of the partially etched bottom channel 152 is preferably equal to the thickness of the remaining material of the partially etched top channels 154 and 156, respectively. Generally, the thickness of the remaining material of the channels is between about 1 mils and about 3 mils. The thickness of the remaining material of the channels in the illustrated embodiment is about 1.5 mils.

Figure 10:
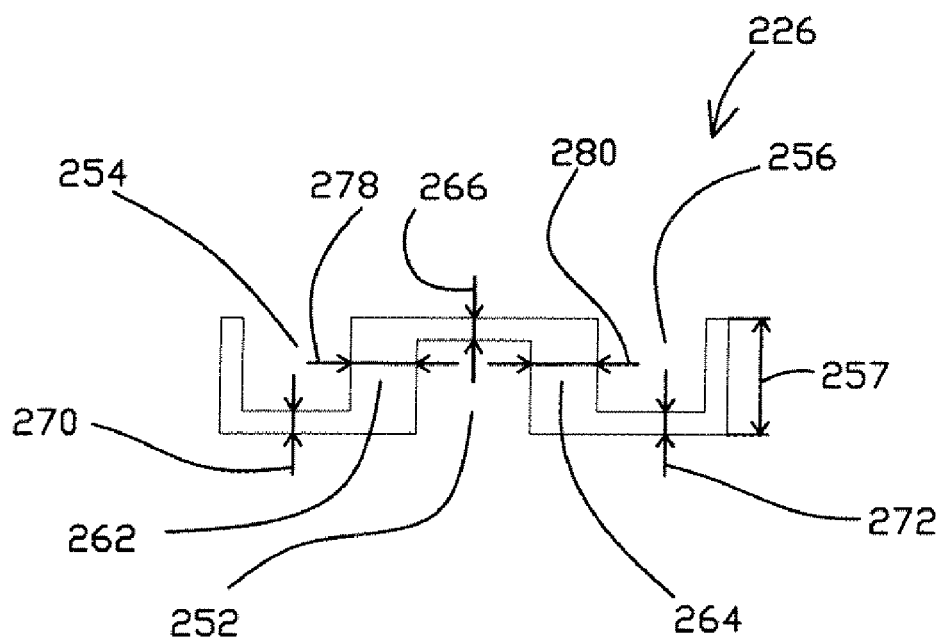
FIG. 10 is a cross-sectional view of the etched rail load beam of FIG. 9a, taken along Line 10-10.
Figure 9A:
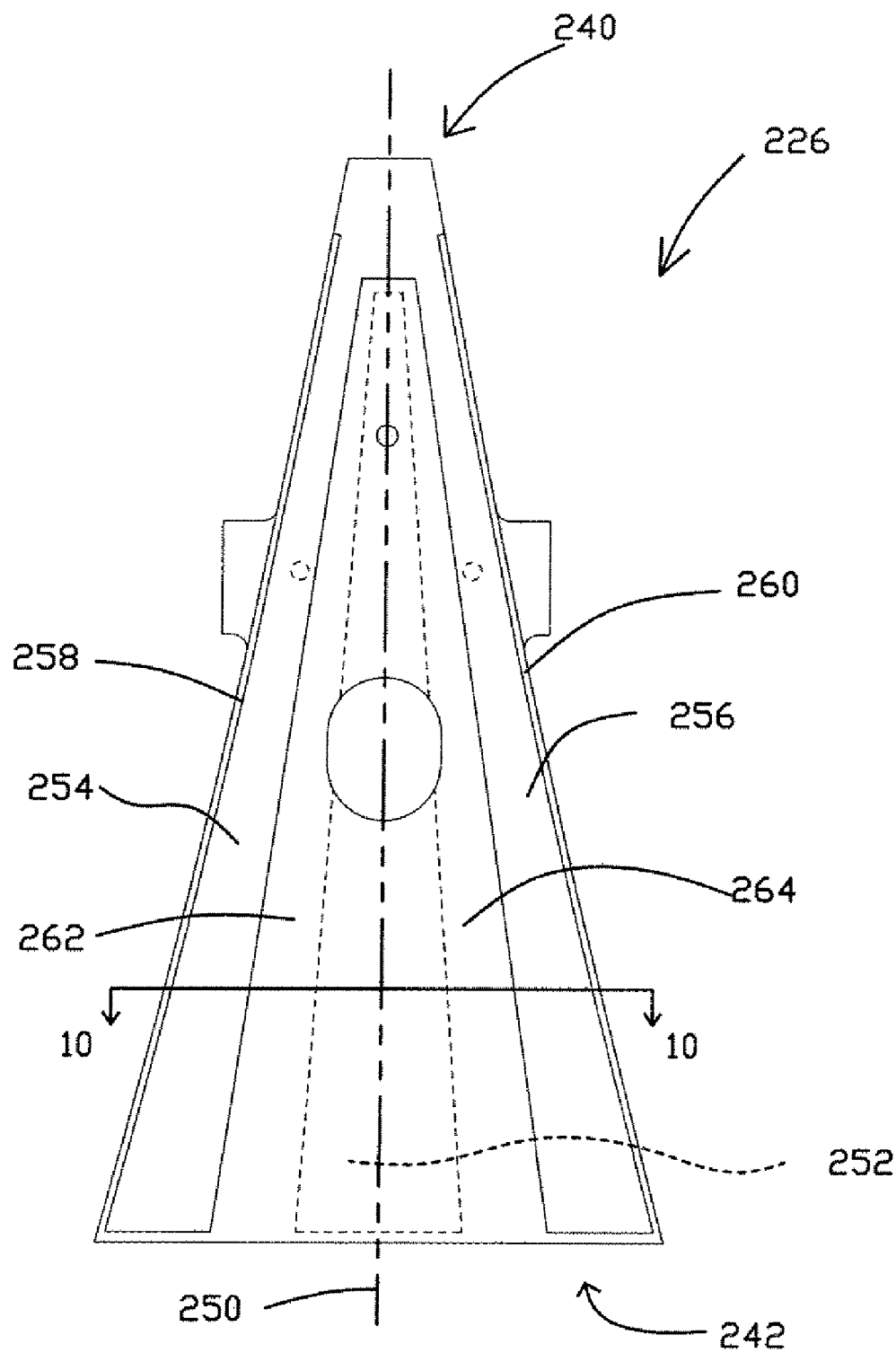
FIG. 9a is a top view of a third embodiment of an etched rail load beam in accordance with the present invention.
Figure 9B:
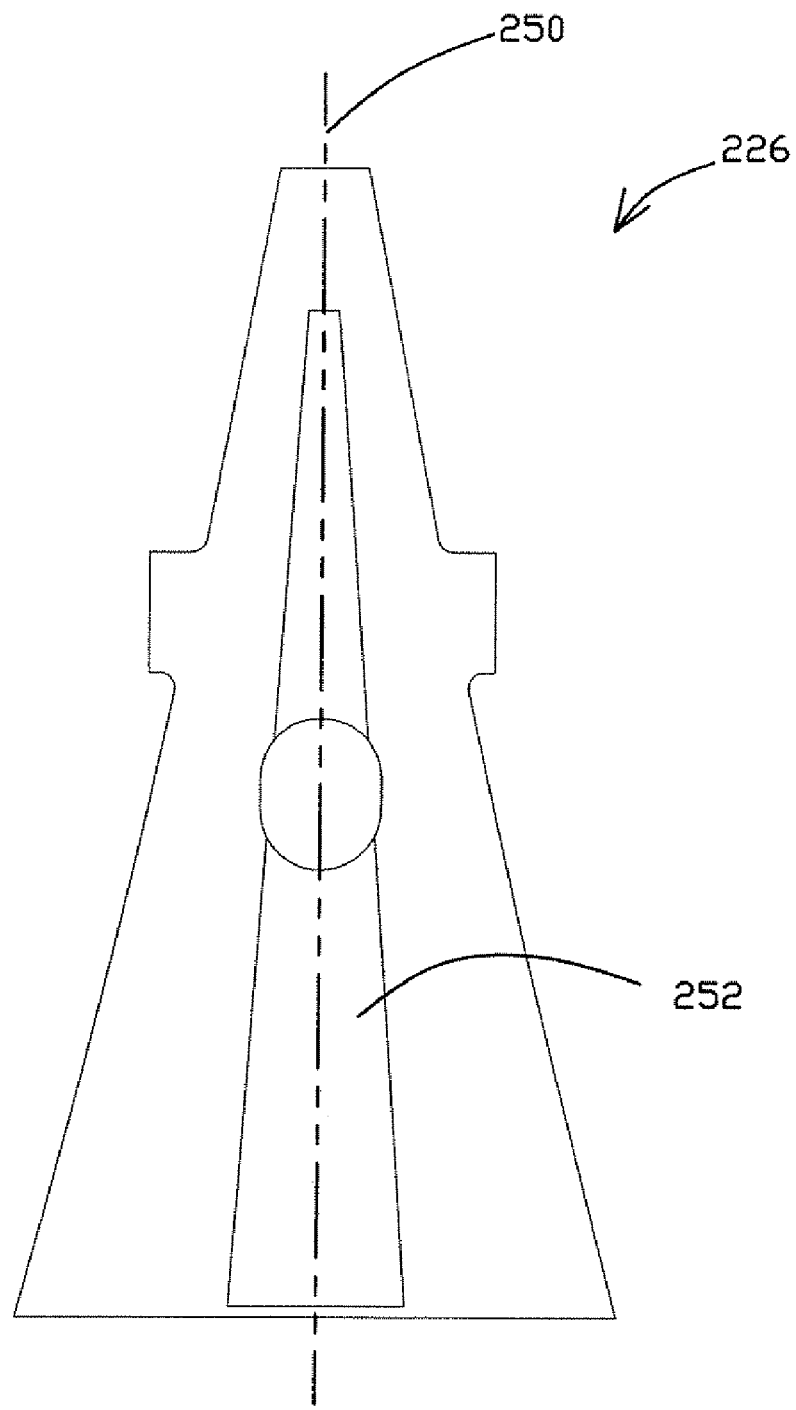

FIGS. 9a and 9b illustrate a third embodiment of an etched rail load beam 226. FIG. 10 is a cross-sectional view of the etched rail load beam 226 of FIG. 9a, taken along Line 10-10.

The structure of the load beam 226 is similar to that of the load beam 26 shown in FIGS. 2a and 2b, except for the shape of the partially etched bottom channel 252 and the shape of the inner rails 262 and 264.

The width 278 of the first inner rail 262 defined by the partially etched bottom channel 252 and the first partially etched top channel 254 is not uniform with increasing distance from the proximal end 242 of the load beam 226. The first inner rail 262 is tapered such that the width 278 of the first inner rail 262 decreases from the proximal end 242 of the load beam 226 toward the distal end 240 of the load beam 226. Like the first inner rail 262, the second inner rail 264 is tapered, such that the width 280 the second inner rail 264 decreases from the proximal end 242 toward the distal end 240. The first and second inner rails 262 and 264 are generally symmetric with respect to the central longitudinal axis 250.

Generally, the original thickness 257 of the load beam 226 is between about 5 mils and about 12 mils. The original thickness 257 in the illustrated embodiment is about 8 mils. The thickness 266 of the remaining material of the partially etched bottom channel 252 is preferably equal to the thickness 270 and 272 of the remaining material of the partially etched top channels 254 and 256, respectively. Generally, the thickness of the remaining material of the channels is between about 1 mil and about 3 mils. The thickness of the remaining material of the channels in the illustrated embodiment is about 2 mils.

Figure 11A:
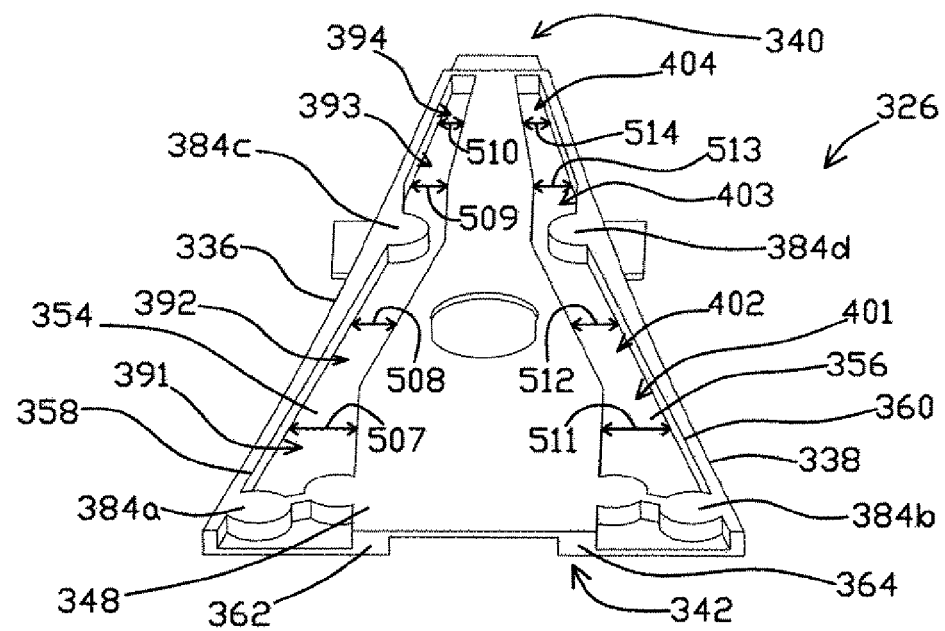
FIG. 11a is an isometric view of the top surface of a fourth embodiment of an etched rail load beam in accordance with the present invention.
Figure 11B:
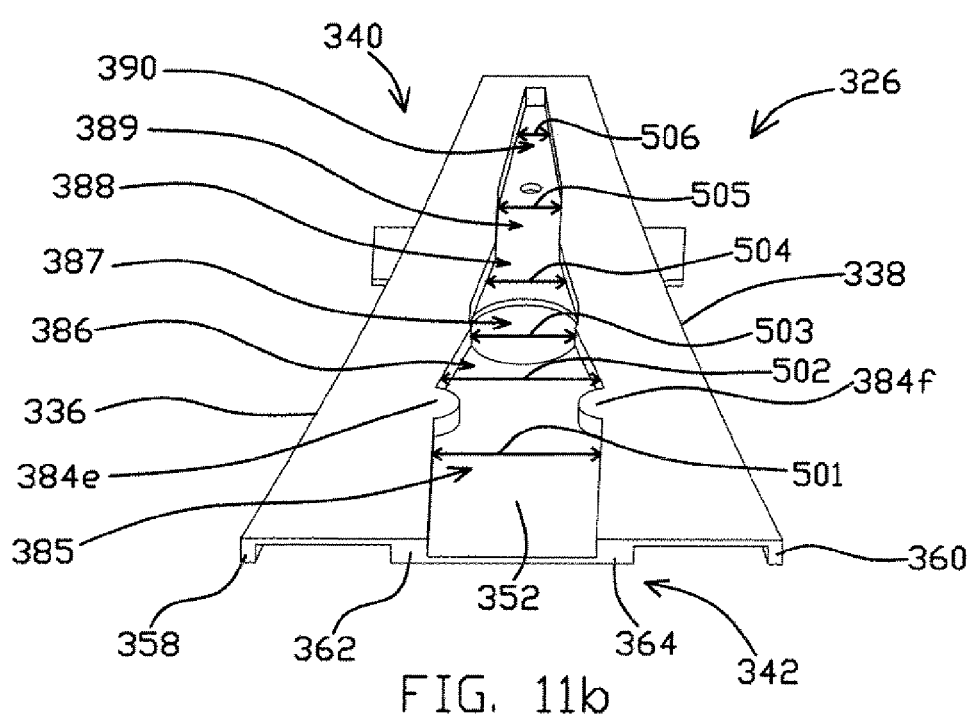

FIGS. 11a and 11b illustrate a fourth embodiment of an etched rail load beam. Similar to the load beam illustrated in FIGS. 2a and 2b, the load beam 326 shown in FIGS. 11a and 11b includes first and second partially etched top channels 354 and 356. The load beam 326 also includes a partially etched bottom channel 352 located in a central rail structure 348. The lengths of the central rail structure 348 and the partially etched bottom channel 352 extend substantially an entire distance between the distal and proximal ends 340 and 342 of the load beam 326 in the illustrated embodiment. The first partially etched top channel 354 is located along and adjacent to the first edge 336 to define a first outer rail 358. The second partially etched top channel 356 is located along and adjacent to the second edge 338 to define a second outer rail 360. The first partially etched top channel 354 and the partially etched bottom channel 352 define a first inner rail 362. The second partially etched top channel 356 and the partially etched bottom channel 352 define a second inner rail 364.

The shapes of the partially etched bottom channel 352 and the partially etched top channels 354 and 356 are different from those of the load beam illustrated in FIGS. 2a and 2b. The partially etched bottom channel 352 has a plurality of portions 385-390 along the length of the channel 352. The portions 386, 388, 390 are tapered, such that the widths 502, 504, and 506 of these portions decrease with increasing distance from the proximal end 342 of the load beam 326, respectively. In contrast, the widths 501, 503, and 505 of the remaining portions 385, 387, and 389 are uniform with increasing distance from the proximal end 342 of the load beam 326, respectively.

The first and second partially etched top channels 354 and 356 have a plurality of portions 391-394 and 401-404 along the length of the channels 354 and 356, respectively. The portions 391 and 394 of the first channel 354 are tapered, such that the widths 507 and 510 of the portions 391 and 394 decrease with increasing distance from the proximal end 342 of the load beam 326. The width 508 of the portion 392 of the channel 354 is uniform with increasing distance from the proximal end 342 of the load beam 326. The width 509 of the portion 393 is also uniform with increasing distance from the proximal end 342 of the load beam 326.

Like the first top channel 354, portions 401 and 404 of the second channel 356 is tapered, such that the widths 511 and 514 of the portions decrease with increasing distance from the proximal end 342 of the load beam 326. The width 512 of the portion 402 of the channel 356 is uniform with increasing distance from the proximal end 342 of the load beam 326. The width 513 of the portion 403 is also uniform with increasing distance from the proximal end 342 of the load beam 326.

Unlike the load beam shown in FIG. 2a, the load beam 326 does not include a proximal rail at the proximal end 342. Further, the first and second partially etched top channels 354 and 356 do not join together at the distal end 340.

The load beam 326 further includes a plurality of weld pads 384a-384f, so that the head suspension components, such as the mounting member and the flexure can be welded to the load beam 326. In the illustrated embodiment, the weld pads 384a-384d are located within the partially etched top channels 354 and 356. The thickness of the weld pads 384a-384d is equal to the depth of the partially etched top channels 354 and 356. The weld pads 384e and 384f are located within the partially etched bottom channel 352. The thickness of the weld pads 384e and 384f is equal to the depth of the partially etched bottom channels 352.

The head suspension load beam having partially etched channels of the present invention provides a number of advantages over the prior art. Since the rails of the present invention is defined by the partial etched channels, the process of bending edges out of the plane of the load beam is not required. Consequently, the head suspension load beam in accordance with the present invention can be efficiently manufactured.

Figure 12A:
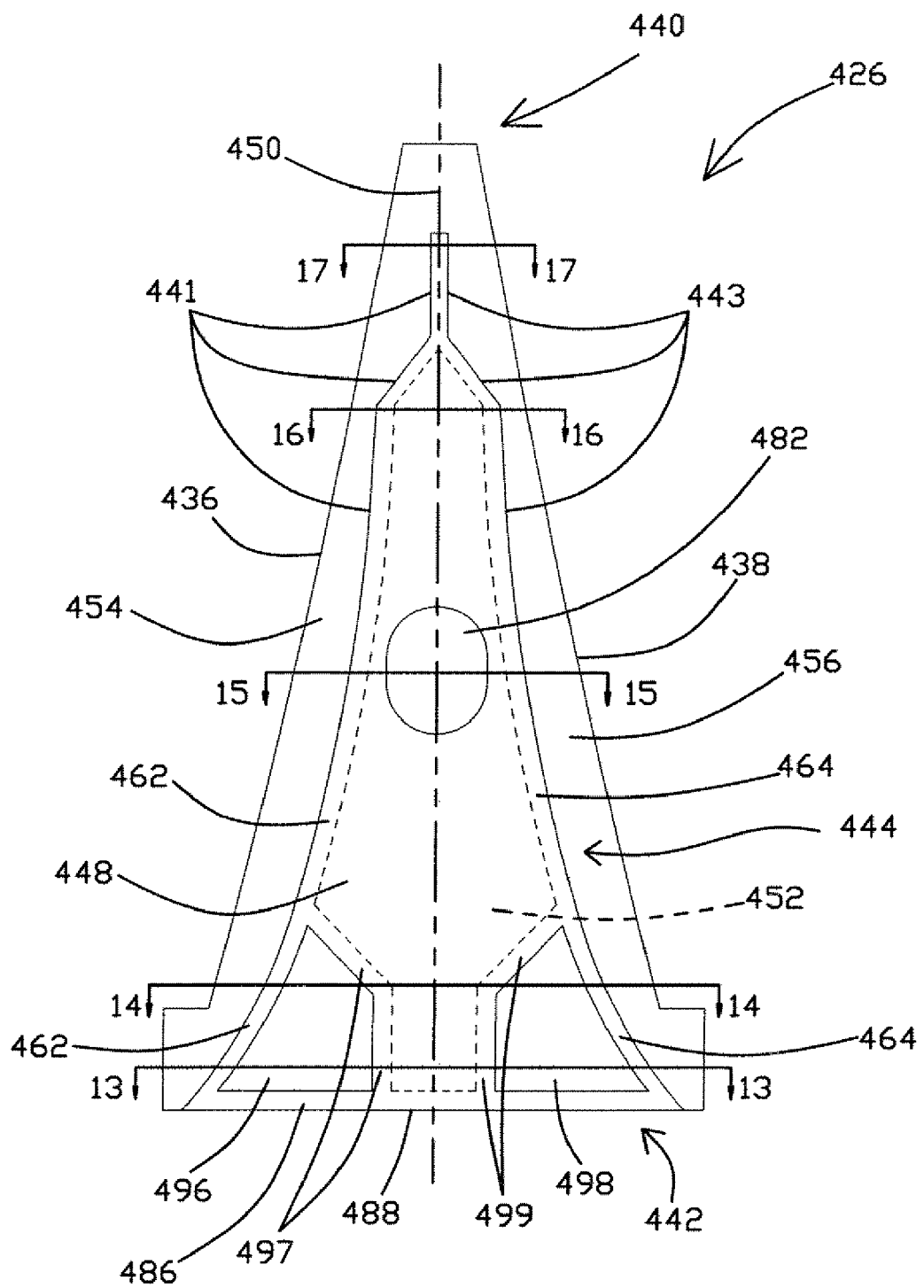
FIG. 12a is a top view of a fifth embodiment of an etched rail load beam in accordance with the present invention.
Figure 12B:
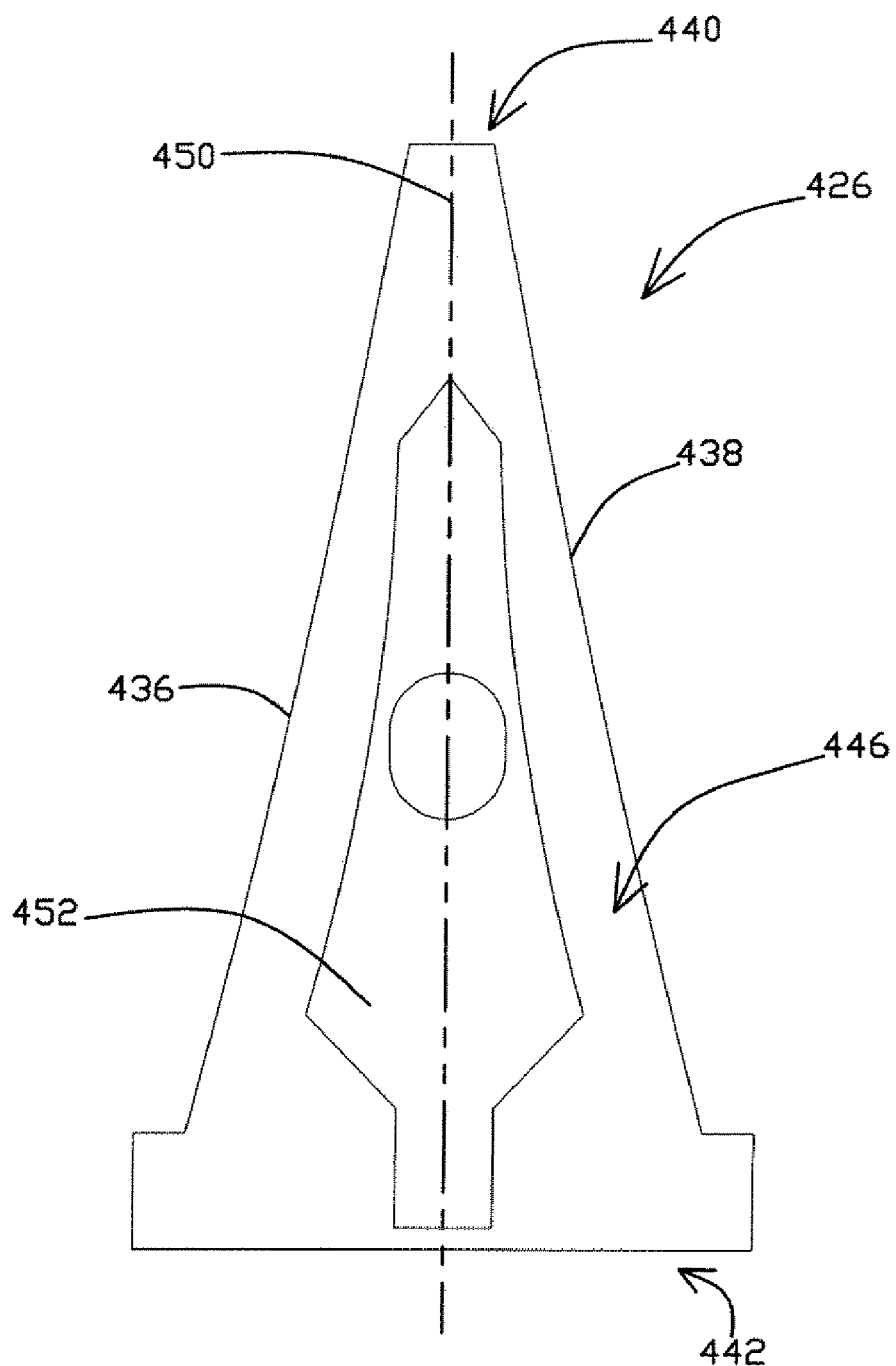
Figure 13:
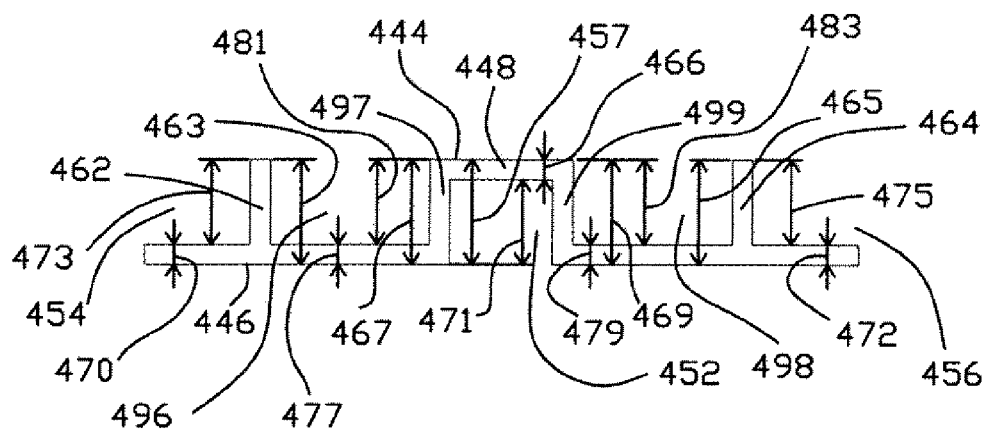
FIG. 13 is a cross-sectional view of the etched rail load beam of FIG. 12a, taken along Line 13-13.
Figure 14:
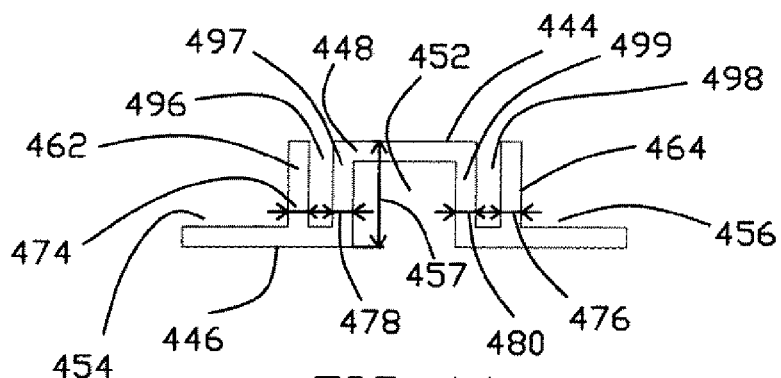
FIG. 14 is a cross-sectional view of the etched rail load beam of FIG. 12a, taken along Line 14-14.
Figure 15:
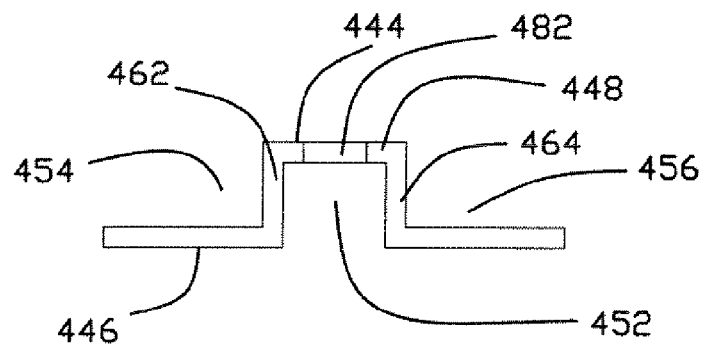
FIG. 15 is a cross-sectional view of the etched rail load beam of FIG. 12a, taken along Line 15-15.
Figure 16:
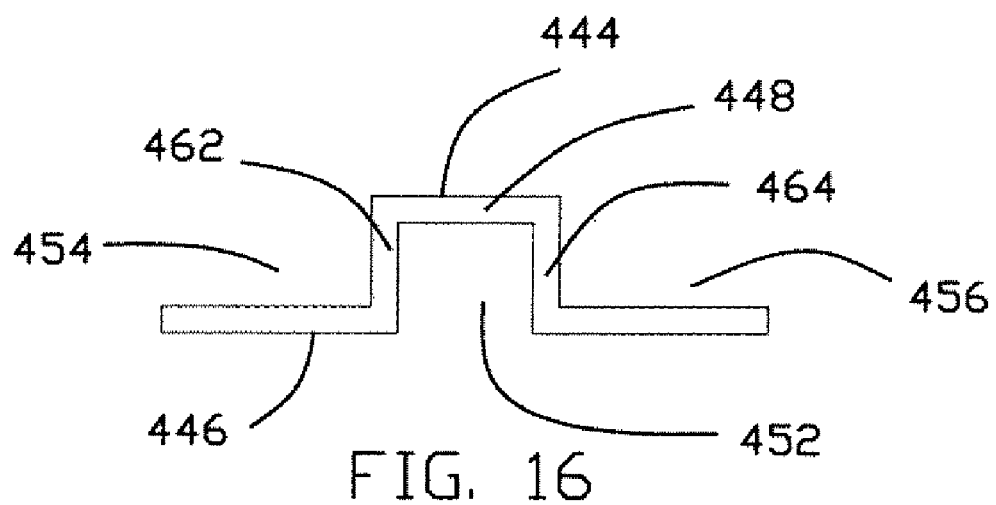
FIG. 16 is a cross-sectional view of the etched rail load beam of FIG. 12a, taken along Line 16-16.
Figure 17:
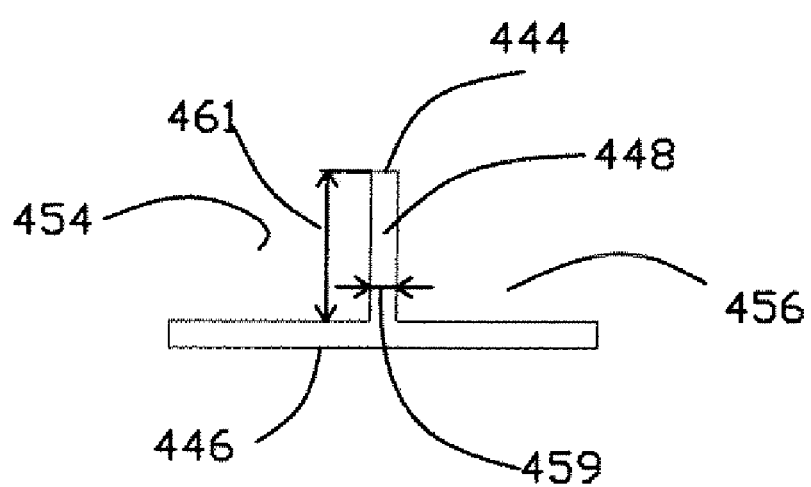
FIG. 17 is a cross-sectional view of the etched rail load beam of FIG. 12a, taken along Line 17-17.

FIGS. 12a and 12b illustrate a fifth embodiment of an etched rail load beam 426. The load beam 426 includes a first edge 436, a second edge 438, a distal end 440, a proximal end 442, a top surface 444, and a bottom surface 446. The load beam 426 has a central rail structure 448 that extends generally along a central longitudinal axis 450 of the load beam 426. A bottom channel 452 is partially etched into the bottom surface 446 of the load beam 426. The partially etched bottom channel 452 is located in the central rail structure 448 and extends along the central longitudinal axis 450. In the illustrated embodiment, the central rail structure 448 and the partially etched bottom channel 452 extend greater than about one-half a length of the load beam 426. Alternatively, the lengths of the central rail structure 448 and the partially etched bottom channel 452 extend substantially an entire distance between the distal and proximal ends 440 and 442 of the load beam 426.

First and second top portions 454 and 456 are partially etched into the top surface 444 of the load beam 426, respectively. The first partially etched top portion 454 is located along and adjacent to the first edge 436. Similarly, the second partially etched top portion 456 is located along and adjacent to the second edge 438. In the illustrated embodiment, the lengths of the first and second partially etched top portions 454 and 456 extend substantially an entire distance between the distal and proximal ends 440 and 442 of the load beam 426, respectively. The first and second partially etched top portions 454 and 456 join together at the distal end 440 of the load beam 426 in the illustrated embodiment. Alternatively, lengths of the first and second partially etched top portions 454 and 456 may extend a partial distance between the distal and proximal ends 440 and 442, respectively.

The first partially etched top portion 454 includes an edge 436, which also is the edge of the load beam 426. The first partially etched top portion 454 further includes an edge 441, which also is an edge of the central rail structure 448. The edge 441 in the illustrated embodiment is partially linear and partially curvilinear. Alternatively, the edge 441 can be completely linear or complete curvilinear. The second partially etched top portion 456 includes an edge 438, which also is the edge of the load beam 426. The second partially etched top portion 456 further includes an edge 443, which also is another edge of the central rail structure 448. The edge 443 in the illustrated embodiment is partially linear and partially curvilinear. Alternatively, the edge 443 can be completely linear or complete curvilinear In the illustrated embodiment, the load beam 426 also includes third and fourth top portions 496 and 498 partially etched into the top surface 444, respectively. The third and fourth partially etched top portions 496 and 498 are located in the central rail structure 448 and adjacent to the proximal end of the load beam 426. The third and fourth partially etched top portions 496 and 498 are used to enhance the lateral stiffness of the load beam 426.

FIGS. 13-17 are cross-sectional views of the etched rail load beam 426 of FIG. 12a, taken along Lines 13-13, 14-14, 15-15, 16-16, and 17-17 respectively. As shown in these figures, the cross section of the load beam 426 has a corrugated shape. The load beam 426 has an original thickness 457 between the top and bottom surfaces 444 and 446. Generally, the original thickness of the load beam is between about 5 mils and about 12 mils. In the illustrated embodiment, the original thickness 457 is about 8 mils.

Referring to FIGS. 12a, 12b, and 13-17, the first partially etched top portion 454 in the top surface 444 and the partially etched bottom channel 452 in the bottom surface 446 define a first inner rail 462. The first partially etched top portion 454 and the third partially etched top portion 496 in the top surface 444 also define the first inner rail 462. Likewise, the second partially etched top portion 456 in the top surface 444 and the partially etched bottom channel 452 in the bottom surface 446 define a second inner rail 464. The second partially etched top portion 456 and the fourth partially etched top portion 498 in the top surface 444 also define the second inner rail 464. In addition, the third partially etched top portion 496 and the partially etched bottom channel 452 define a third inner rail 497, while the fourth partially etched top portion 498 and the partially etched bottom channel 452 define a fourth inner rail 499. In the illustrated embodiment, the first inner rail 462 and the second inner rail 464 join together with increasing distance from the proximal end 442.

The load beam 426 further includes a proximal rail 486 located at the proximal end 442 of the load beam 426. The proximal rail 486 is defined by an edge 488 of the proximal end 442, the partially etched bottom channel 452, the third partially etched top portion 496, and the fourth partially etched top portion 498. The proximal rail 486 is generally perpendicular to the central longitudinal axis 450.

The height 463 of the first inner rail 462, the height 465 of the second inner rail 464, the height 467 of the third inner rail 497, the height 469 of the fourth inner rail 499, and the height of the proximal rail 486 are generally equal. They are all equal to the original thickness 457 of the load beam 426. The thickness 470 of the remaining material of the first partially etched top portion 454, the thickness 472 of the remaining material of the second partially etched top portion 456, the thickness 477 of the remaining material of the third partially etched top portion 496, and the thickness 479 of the remaining material of the fourth partially etched top portion 498 are generally equal. The partially etched bottom channel 452 has a depth 471 that overlaps the depths 473, 475, 481, and 483 of first, second, third, and fourth partially etched top portions 454, 456, 496, and 498, respectively. The dimensions of the overlap vary with the original thickness of the load beam and the thickness of the remaining material. The thickness 466 of the remaining material of the partially etched bottom channel 452 is preferably equal to the thicknesses 470, 472, 477, 479 of the remaining material of the first, second, third, and fourth partially etched top portions 454, 456, 496, and 498, respectively. Generally, the thickness of the remaining material of the channels is between about 1 mil and about 3 mils. The thickness of the remaining material of the channels in the illustrated embodiment is about 1 mil.

In general, the structures of the load beam 426 are symmetric with respect to the central longitudinal axis 450. In particular, the partially etched bottom channel 452 is symmetric with respect to the central longitudinal axis 450. The central rail structure 448 is also symmetric with respect to the central longitudinal axis 450. In addition, the first and second partially etched top portions 454 and 456 are symmetric with respect to the central longitudinal axis 450. The third and fourth partially etched top portions 496 and 498 are symmetric with respect to the central longitudinal axis 450.

Moreover, the first and second inner rails 462 and 464 are generally symmetric with respect to the central longitudinal axis 450. The third and fourth inner rails 497 and 499 are generally symmetric with respect to the central longitudinal axis 450. The fifth inner rail is also symmetric with respect to the central longitudinal axis 450. In the illustrated embodiment, the width 474 of the first inner rail 462, the width 476 of the second inner rail 464, the width 478 of the third inner rail 497, the width 480 of the fourth inner rail 499, and the width 459 of the fifth inner rail are uniform with increasing distance from the proximal end 442 of the load beam 426. In an alternative embodiment, the widths 474 and 476 are uniform, while the widths 478 and 480 are not uniform. In an alternative embodiment, the widths 478 and 480 are uniform, while the widths 474 and 476 are not uniform. In an alternative embodiment, the widths 474, 476, 478 and 480 are all not uniform. Generally, the widths 474, 476, 478, 480, and 459 are between about 0.05 mm and about 0.3 mm.

The load beam 426 generally has a delta shape in the illustrated embodiment. In other words, the load beam 426 has a tapered width such that the width decreases from its proximal end 442 toward its distal end 440. The central rail structure 448 has a shape generally corresponding to the shape of the load beam 426.

The load beam 426 generally includes at least one aperture 482. The aperture 482 completely extends through the remaining material of the partially etched bottom channel 452. The aperture 482 can be used as a tooling hole during assembly of the load beam 426 or during attachment of the slider.

Figure 18:
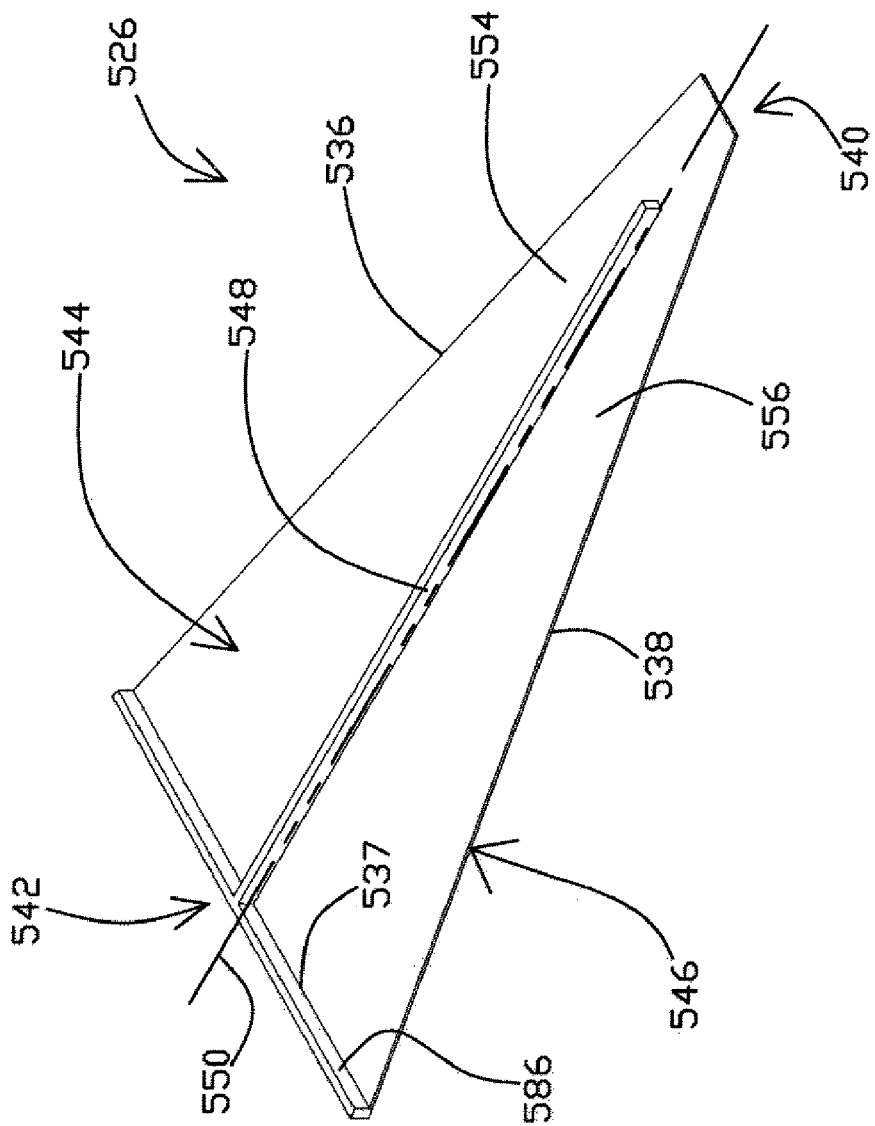
FIG. 18 is an isometric view of a sixth embodiment of an etched rail load beam in accordance with the present invention.

FIG. 18 is an isometric view of a sixth embodiment of an etched rail load beam in accordance with the present invention. The head suspension load beam 526 has a longitudinal axis 550, top and bottom surfaces 544 and 546, first and second edges 536 and 538, and proximal and distal ends 540 and 542. The bottom surface 546 of the load beam 526 is substantially flat. The load beam 526 has a rail 548 and a proximal rail 586 on the top surface 544. The rail 548 is a central rail structure. The rail 548 extends along the longitudinal axis 550 and is symmetric with respect to the central longitudinal axis 550. The proximal rail 586 extends along the edge 537 of the proximal end 542 of the load beam 560.

The load beam 526 also includes a first elongated partially etched portion 554 and a second elongated partially etched portion 556 in the top surface 544. The first elongated partially etched portion 554 extends along a substantially entire length of the first edge 536 of the load beam 526. The first elongated partially etched portion 554 is enclosed by the rail 548, the first edge 536, and a portion of the proximal rail 586. The second elongated partially etched portion 556 extends along a substantially entire length of the second edge 538 of the load beam 526. The second elongated partially etched portion 556 is enclosed by the rail 548, the second edge 538, and a portion of the proximal rail 586. The first and second elongated partially etched portions 554 and 556 are generally symmetric with respect to the longitudinal axis 550. In the illustrated embodiment, the first and second elongated partially etched portions 554 and 556 join together at the distal end 540 of the load beam 526.

Figure 19:
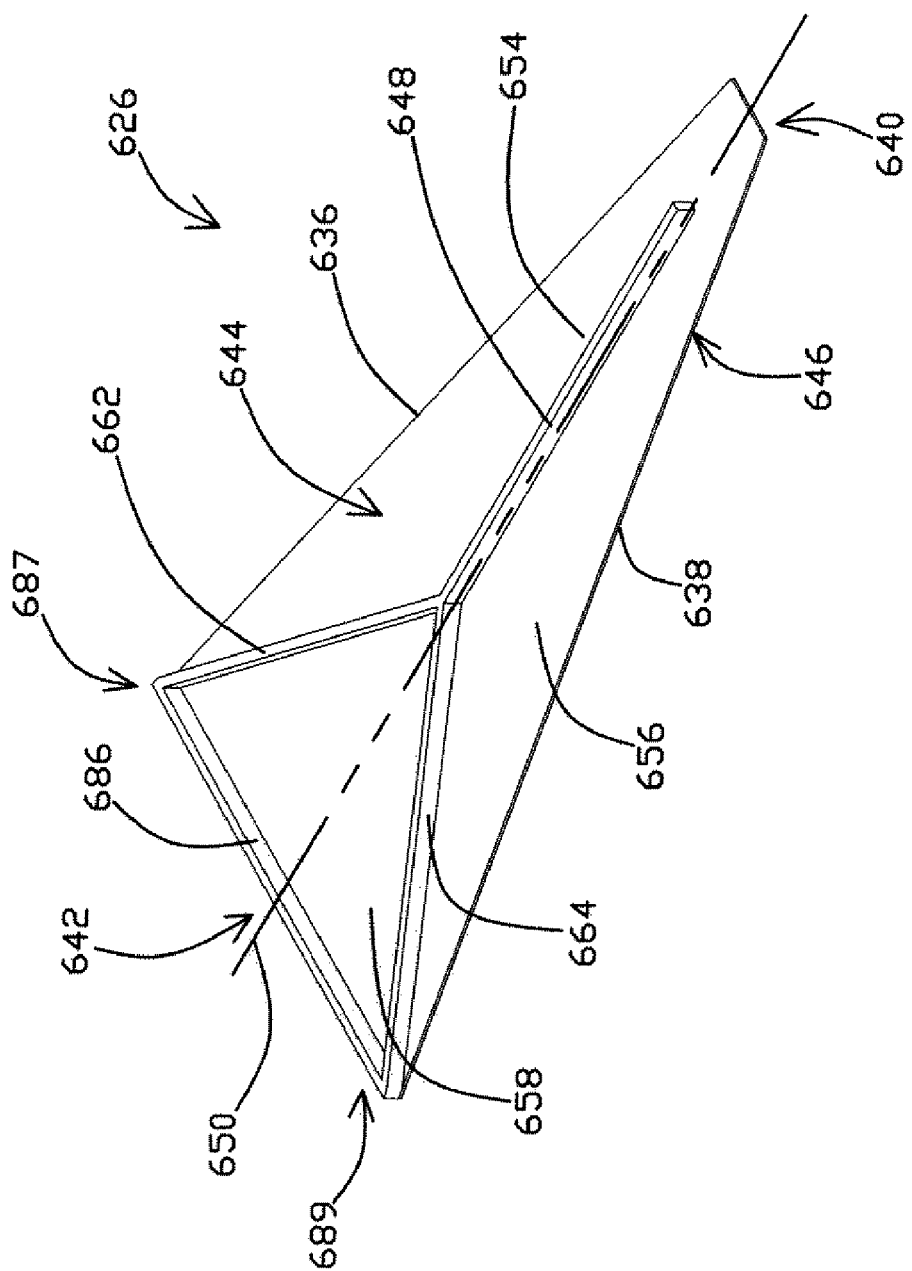
FIG. 19 is an isometric view of a seventh embodiment of an etched rail load beam in accordance with the present invention.

FIG. 19 is an isometric view of a seventh embodiment of an etched rail load beam in accordance with the present invention. The head suspension load beam 626 has a longitudinal axis 650, top and bottom surfaces 644 and 646, first and second edges 636 and 638, and proximal and distal ends 640 and 642. The bottom surface 646 of the load beam 626 is substantially flat. The load beam 626 has a rail 648, a proximal rail 686, a first inner rail 662, and a second inner rail 664 on the top surface 644. The rail 648 is a central rail structure. The rail 648 extends along the longitudinal axis 650 and is symmetric with respect to the central longitudinal axis 650. The proximal rail 686 extends along the edge 637 of the proximal end 642 of the load beam 660. The first inner rail 662 extends across a partial region of the first elongated partially etched portion 654. The second inner rail 664 extends across a partial region of the second elongated partially etched portion 656. The first and second inner rails 662 and 664 are generally symmetric with respect to the longitudinal axis 650 of the load beam 626. In the illustrated embodiment, the first inner rail 662 connects the rail 648 to the first end 687 of the proximal rail 686, while the second inner rail 664 connects the rail 648 to the second end 689 of the proximal rail 686. In the illustrated embodiment, the first and second inner rails 662 and 664 and the rail 648 are positioned to form a "Y" shape on the top surface 644, while the first and second inner rails 662 and 664 and the proximal rail 686 are positioned to form a triangular shape on the top surface 644.

The load beam 626 also includes a first elongated partially etched portion 654 and a second elongated partially etched portion 656 in the top surface 544. The first elongated partially etched portion 654 extends along a substantially entire length of the first edge 636 of the load beam 626. The second elongated partially etched portion 656 extends along a substantially entire length of the second edge 638 of the load beam 626. In the illustrated embodiment, the first elongated partially etched portion 654 is enclosed by the rail 648, the first edge 636, and the first inner rail 662. The second elongated partially etched portion 656 is enclosed by the rail 648, the second edge 638, and the second inner rail 664. The first and second elongated partially etched portions 654 and 656 are generally symmetric with respect to the longitudinal axis 650. In the illustrated embodiment, the first and second elongated partially etched portions 654 and 656 join together at the distal end 640 of the load beam 626. The load beam 626 further includes a third elongated partially etched portion 658 in the top surface 644. In the illustrated embodiment, the third elongated partially etched portion 658 is enclosed by the proximal rail 686, a first inner rail 662, and a second inner rail 664.

The head suspension load beam having rails in accordance with the present invention provides optimized resonance characteristics over the prior art. The detrimental effects of the bending and twisting at the resonance frequencies can therefore be significantly reduced.

All patents and patent applications disclosed herein, including those disclosed in the background of the invention, are hereby incorporated by reference. Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

We claim:

1. A head suspension load beam including first and second opposite surfaces, first and second edges, and proximal and distal ends, the head suspension load beam comprising:

at least an elongated partially etched channel in the first surface, the partially etched channel having remaining material having a thickness;

at least a first elongated partially etched portion in the second surface, the first partially etched portion having remaining material having a thickness, and wherein at least a part of the portion is located between the partially etched channel in the first surface and the first edge of the load beam;

a rail between the partially etched channel and the first partially etched portion, the rail having a thickness that is greater than the thicknesses of the remaining material of the partially etched channel and the remaining material of first partially etched portion;

at least a second elongated partially etched portion in the second surface, the second partially etched portion having remaining material having a thickness, and wherein at least a part of the portion is located between the partially etched channel in the first surface and the second edge of the load beam; and a rail between the partially etched channel and the second partially etched portion, the rail having a thickness that is greater than the thicknesses of the remaining material of the partially etched channel and the remaining material of the second partially etched portion.

2. A head suspension load beam including first and second opposite surfaces, first and second edges, and proximal and distal ends, the head suspension load beam comprising:

an elongated partially etched channel in the first surface, the partially etched channel having remaining material having a thickness;

a first elongated partially etched portion in the second surface adjacent to the first edge, the first partially etched portion having remaining material having a thickness;

a rail between the partially etched channel and the first partially etched portion, the rail having a thickness that is greater than the thicknesses of the remaining material of the partially etched channel and the remaining material of first partially etched portion;

a second elongated partially etched portion in the second surface adjacent to the second edge, the second partially etched portion having remaining material having a thickness; and a rail between the partially etched channel and the second partially etched portion, the rail having a thickness that is greater than the thicknesses of the remaining material of the partially etched channel and the remaining material of the second partially etched portion.

3. The head suspension load beam of claim 2, wherein the elongated partially etched channel in the first surface extends along a central longitudinal axis of the load beam.

4. The head suspension load beam of claim 2, wherein:
the first partially etched portion in the second surface is located between the first elongated partially etched channel in the first surface and the first edge of the load beam; and
the second partially etched portion in the second surface is located between the first elongated partially etched channel in the first surface and the second edge of the load beam.

5. The head suspension load beam of claim 2, wherein the elongated partially etched channel in the first surface has a depth generally overlapping the first and second elongated partially etched portions in the second surface.

6. The head suspension load beam of claim 2, wherein lengths of the elongated partially etched channel and portions in the first and second surfaces are greater than about one-half a length of the load beam.

7. The head suspension load beam of claim 2, wherein lengths of the elongated partially etched channel and portions in the first and second surfaces extend substantially an entire distance between the proximal and distal ends of the load beam.

8. The head suspension load beam of claim 2, wherein a thickness of the load beam between the first and second surfaces is equal to or greater than about 5 mils.

9. The head suspension load beam of claim 2, wherein a width of the elongated partially etched channel in the first surface decreases with increasing distance from the proximal end of the load beam.

10. The head suspension load beam of claim 2, wherein a width of the elongated partially etched portions in the second surface decreases with increasing distance from the proximal end of the load beam.

11. The head suspension load beam of claim 2, wherein:
the first elongated partially etched portion in the second surface and the first edge of the load beam define at least a part of a first outer rail; and
the second elongated partially etched portion in the second surface and the second edge of the load beam define at least a part of a second outer rail.

12. The head suspension load beam of claim 2, wherein the load beam is free from rails formed out of a plane of the first and second surfaces.

13. A head suspension load beam formed from sheet material having a thickness, comprising partially etched channels adjacent to edges of the load beam to define rails on the edges of the load beam, the rails having a height equal to the thickness of the material, the partially etched channels having remaining material having a thickness, and wherein the thickness of the remaining material of the channels is less than the height of the rails on the edges of the load beam.

14. A head suspension to be connected to an actuator of a rigid disk drive and for supporting a magnetic head, the head suspension including a load beam having first and second edges, distal and proximal ends, and first and second opposite surfaces, the load beam comprising:
a central rail structure along the central longitudinal axis of the load beam, the central rail structure including a partially etched channel in the first surface of the load beam, and the partially etched channel extending along at least a part of the central longitudinal axis and having a thickness of a remaining material less than an original thickness of the load beam;
a first partially etched portion located in the second surface and adjacent to the first edge of the load beam, the first partially etched portion having a thickness of a remaining material less than the original thickness of the load beam;
a second partially etched channel located in the second surface and adjacent to the second edge of the load beam, the second partially etched portion having a thickness of a remaining material less than the original thickness of the load beam, wherein the first and second partially etched portions are generally symmetric with respect to the central longitudinal axis;
a first inner rail located between the partially etched channel in the first surface and the first partially etched portion in the second surface, the first inner rail having a thickness that is greater than the thicknesses of the remaining material of the partially etched channel and the remaining material of the first partially etched portion; and
a second inner rail located between the partially etched channel in the first surface and the second partially etched portion in the second surface, the second inner rail having a thickness that is greater than the thicknesses of the remaining material of the partially etched channel and the remaining material of the second partially etched portion, and wherein the first and second inner rails are generally symmetric with respect to the central longitudinal axis of the load beam.

15. The head suspension of claim 14 further comprising:
a first outer rail extending generally along the first edge of the load beam; and
a second outer rail extending generally along the second edge of the load beam, wherein the first and second outer rails are generally symmetric with respect to a central longitudinal axis of the load beam.

16. The head suspension of claim 15, wherein the first and second outer rails each have a height equal to the original thickness of the load beam.

17. The head suspension of claim 15, wherein the first and second outer rails each have a uniform width along a length of each outer rail.

18. The head suspension of claim 14, wherein the partially etched channel in the first surface has a shape generally corresponding to a shape of the load beam.

19. The head suspension of claim 14, wherein at least a part of the partially etched channel in the first surface has a tapered width such that the width decreases from the proximal end of the load beam toward the distal end of the load beam.

20. The head suspension of claim 14, wherein at least a part of the first and second partially etched portions in the second surface each have a tapered width such that the width decreases from the proximal end of the load beam toward the distal end of the load beam.

21. The head suspension of claim 14, wherein the first and second partially etched portions in the second surface join together at the distal end of the load beam.

22. The head suspension of claim 14 further comprising at least one aperture extending therethrough.

23. The head suspension of claim 14, wherein the load beam has a cross section including a corrugated shape.

24. The head suspension of claim 14, wherein the load beam includes a proximal rail located at the proximal end of the load beam.

25. The head suspension of claim 24, wherein the proximal rail is perpendicular to the central longitudinal axis of the load beam.

26. The head suspension of claim 24, wherein the proximal rail has the original thickness of the load beam.

27. A head suspension load beam including a longitudinal axis, first and second opposite surfaces, first and second edges, and proximal and distal ends, the head suspension load beam comprising:
- a central rail structure including one or more rails on the first surface of the load beam having a thickness and extending along at least a part of the longitudinal axis;
- a first elongated partially etched portion in the first surface of the load beam extending along a substantially entire length of the first edge of the load beam, the first partially etched portion having remaining material having a thickness less than the thicknesses of the one or more rails of the central rail structure; and
- a second elongated partially etched portion in the first surface of the load beam extending along a substantially entire length of the second edge of the load beam, the second partially etched portion having a remaining material having a thickness less than the thicknesses of the one or more rails of the central rail structure.

28. The head suspension load beam of claim 27 wherein the central rail structure includes an elongated partially etched channel in second surface of the load beam extending along at least a part of the longitudinal axis.

* * * * *